United States Patent
Russell

(10) Patent No.: US 7,588,050 B1
(45) Date of Patent: Sep. 15, 2009

(54) SECURITY CAP FOR GAS SERVICE VALVE

(76) Inventor: Jim L. Russell, 3707 E. 66th St., Tulsa, OK (US) 74136

( * ) Notice: Subject to any disclaimer, the term of this patent is extended or adjusted under 35 U.S.C. 154(b) by 561 days.

(21) Appl. No.: 11/240,912

(22) Filed: Sep. 30, 2005

(51) Int. Cl.
*F16K 35/10* (2006.01)
(52) U.S. Cl. .................... 137/384; 137/385; 70/177
(58) Field of Classification Search ............ 70/177, 70/178, 179; 137/382, 385, 384
See application file for complete search history.

(56) References Cited

U.S. PATENT DOCUMENTS

| | | | | | |
|---|---|---|---|---|---|
| 822,025 | A | * | 5/1906 | Sisco | 137/384 |
| 971,639 | A | * | 10/1910 | Renick et al. | 137/384 |
| 1,131,821 | A | * | 3/1915 | Campbell | 137/382 |
| 1,171,453 | A | * | 2/1916 | Miller | 137/384 |
| 1,215,958 | A | * | 2/1917 | Miller | 137/384 |
| 1,590,032 | A | * | 6/1926 | Jauch | 137/384 |
| 2,084,963 | A | * | 6/1937 | Paige, Jr. | 137/384 |
| 3,448,762 | A | * | 6/1969 | Schmitt | 137/383 |
| 3,467,356 | A | * | 9/1969 | Mueller | 251/164 |
| 3,980,099 | A | * | 9/1976 | Youngblood | 137/382 |
| 4,208,893 | A | * | 6/1980 | Avrich et al. | 70/178 |
| 4,899,781 | A | * | 2/1990 | Monroe | 137/382 |
| 4,926,900 | A | * | 5/1990 | Pietras | 137/385 |
| 5,143,114 | A | * | 9/1992 | Daniels | 137/385 |
| 5,165,263 | A | * | 11/1992 | Perron et al. | 70/177 |
| 5,305,622 | A | * | 4/1994 | Flores | 70/177 |
| 5,323,805 | A | * | 6/1994 | Scaramucci | 137/385 |
| 6,453,707 | B2 | * | 9/2002 | Nishimura et al. | 70/180 |
| 7,044,148 | B2 | * | 5/2006 | Berger et al. | 137/15.08 |

* cited by examiner

*Primary Examiner*—John Fox
(74) *Attorney, Agent, or Firm*—Gable & Gotwals

(57) ABSTRACT

A cap permanently indicates the occurrence of tampering with a gas service valve. A substantially square base has intersecting slots differently sized to confine correspondingly sized valve cocks against rotational motion. A dome on the base covers the slots and the valve cock. Two ties of adjustable length secure the base against the valve body. The base, dome and ties are of material which is permanently altered by application of force to disorient the mounted cap sufficiently to permit operation of the valve cock. Removal of excess portions of the ties makes reuse difficult, if not impossible. The dome may be transparent so that the orientation of the valve cock can be observed without removing the cap from the valve. Markings on the dome indicate the orientation of the valve cock when the cap was installed.

22 Claims, 2 Drawing Sheets

SECURITY CAP FOR GAS SERVICE VALVE

BACKGROUND OF THE INVENTION

This invention relates generally to gas distribution equipment and more particularly concerns equipment that aids in determining the occurrence of gas valve tampering for the purpose of gas theft.

Typical gas service distribution systems incorporate quarter-turn, flat-headed valves at the customer's meter. The valve cocks rotate ninety degrees between their "open" and "closed" positions. To prevent gas theft before a service valve is turned on or after a service valve is turned off, many gas distribution companies use metal clam shell type devices, either with or without padlocks, to encase the valves with the valve cocks in their "closed" positions. However, regardless of the cost and sophistication of such devices, practical experience demonstrates that a determined consumer can overcome the device to continue service, generally by inflicting permanent damage to the device and the lock. Often, the devices are broken off and thrown away. Such device and lock combinations cost the distribution company $10 to $15 for each tampering incident, a significant financial loss which, in comparison to the lost per-incident gas revenues, makes the security system itself impractical.

Considering the present, and probable future, increases in fuel costs, tampering incidents can be expected to increase nationwide. The cost burdens of such tampering incidents, of course, ultimately find their way to the non-tampering consumers. In anticipation of local legislation affording legal teeth to address this growing problem, inexpensive devices which serve as reminders and deterrents to law-abiding consumers and which serve as evidence in legal enforcement actions against tampering customers are needed.

It is, therefore, a primary object of this invention to provide an inexpensive security cap for a gas service valve. Another object of this invention is to provide a security cap for a gas service valve which requires no padlocks. A further object of this invention is to provide a security cap for a gas service valve which requires no keys. Yet another object of this invention is to provide a security cap for a gas service valve which can be used with either of two differently sized gas service valves. It is also an object of this invention to provide a security cap for a gas service valve which can be used to secure the valve cock in either the "open" or "closed" position. Still another object of this invention is to provide a security cap for a gas service valve which reminds a later observer of the "open" or "closed" status of the valve at the time the security cap was mounted. An additional object of this invention is to provide a security cap for a gas service valve which prevents operation of the valve cock without permanent damage to the security cap. Another object of this invention is to provide a security cap for a gas service valve which can serve as evidence of tampering with the security cap in order to operate the valve. A further object of this invention is to provide a security cap for a gas service valve which is made of material that is permanently deformed, distorted or otherwise damaged by the application of tools to the installed security cap. Yet another object of this invention is to provide a security cap for a gas service valve which is configured to increase the likelihood that the security cap will be damaged by the application of tools to the cap. It is also an object of this invention to provide a security cap for a gas service valve which is secured to the valve by use of plastic type wire ties which are difficult, if not impossible, to reuse on the same valve. Still another object of this invention is to provide a security cap for a gas service valve which is secured to the valve by use of wire ties which are not readily available to the public. An additional object of this invention is to provide a security cap for a gas service valve which is reusable with new ties. Another object of this invention is to provide a security cap for a gas service valve which may be readily visually identified as gas distribution related, such as by use of a "gas distribution yellow" cap color. A further object of this invention is to provide a security cap for a gas service valve which may be transparent or "clear" to permit visual observation of the "open" or "closed" position of the valve cock while the cap is secured on the valve.

SUMMARY OF THE INVENTION

In accordance with the invention, a cap is provided for permanently indicating the occurrence of tampering with a gas service valve in a gas distribution system. The valve has a body with a slotted on-off valve cock for controlling passage of gas from the inlet to the outlet side of the valve. The security cap has a base with a slot sized to confine a valve cock extending into the slot against rotational motion. The base has apertures spaced apart and extending through it proximate its perimeter. A dome integrally extending upwardly from the base covers the slot and has a height sufficient to contain the valve cock which will be installed into the slot. Two preferably fluorescent colored ratchet-type wire ties of adjustable length are used to mount the cap on the valve. One tie tautly extends around the inlet pipe and through a first neighboring pair of the apertures to secure one side of the base snugly against the valve body. The other tie tautly extends around the outlet pipe and through a second neighboring pair of the apertures to secure the opposite side of the base snugly against the valve body. Preferably, the base, dome and ties are made of material which can be permanently altered by application of force to disorient the mounted cap sufficiently to permit operation of the valve cock. Preferably, the material is non-metallic. Most preferably, the base and dome are either nylon or poly-carbonate, the former for color-coded caps and the latter for transparent caps. Most preferably, the ties are nylon. Excess portions of the ties can be removed after ratchet-type taut connection to make re-connection of a disconnected tie difficult, if not impossible. The dome, or the entire cap, may be transparent or clear so that the orientation of the valve cock can be observed without removing the cap from the valve. Indicia may also be provided on the dome to show the orientation of the valve cock at the time the cap was installed.

In a preferred embodiment, the base is substantially square and has intersecting slots defining a cross-shaped opening centered on the base. Each slot is sized to confine a different sized valve cock. The base apertures extend through each of its corners. The dome is centered on the base. Thus, the cap can be oriented in one of two perpendicular alignments on the valve so that one cap can accommodate two different valve sizes.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
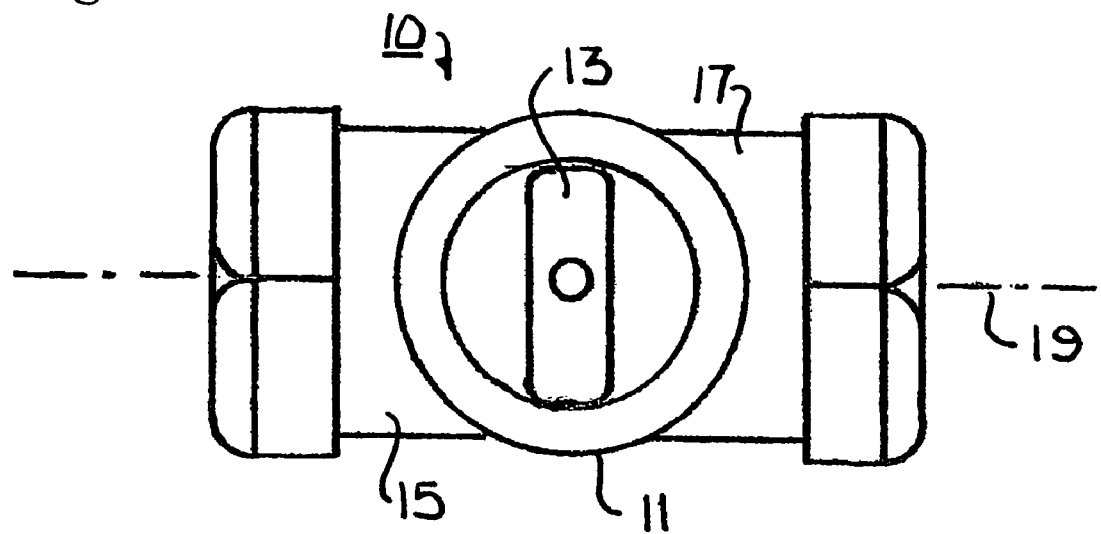
FIG. 1 is a top plan view of a typical quarter-turn, flat headed gas service valve.

Turning first to FIG. 1, a typical quarter-turn, flat-headed gas service valve 10 is illustrated. The valve 10 consists of a body 11 housing a mechanism (not shown) operated by an on-off valve cock 13 to pass or block passage of gas from an inlet pipe 15 through the body 11 to an outlet pipe 17. Normally, when the valve cock 13 extends perpendicular to the pipe axis 19, the valve 10 is "off" and when the valve cock 13 extends parallel to the pipe axis 19, the valve 10 is "on." Typically, such valves 10 are available in ¾", 1", 1¼", 1½", and 2" sizes, the size being indicative of the outer diameter of the inlet and outlet pipes 15 and 17.

A cap 30 for permanently indicating any occurrence of tampering with a gas service valve 10 of the type shown in FIG. 1 is illustrated in FIGS. 2-6. As shown, the cap 30 has a base 40, a dome 50 and a pair of ties 60.

The base 40 is substantially square with perpendicularly intersecting slots 41 and 43 defining a cross-shaped opening centered on the base 40. The slots 41 and 43 are sized to confine different sized valve cocks 21 and 23, respectively, so that a single cap 30 is capable of use in conjunction with either of two different size valves 10. Thus, a valve cock 21 or 23 disposed in a correspondingly sized slot 41 or 43 can be confined by the slot 41 or 43 against rotational motion in relation to the base 40. The base 40 need not necessarily be square and it may have only a single slot 41 or 43 to accommodate a single valve size. The base 40 is said to be substantially square in that, in its preferred embodiment, it may be in the order of approximately ¼" longer than wide, in comparison to a 2" to 3" width, to more easily accommodate the different size pipes 15 and 17 that it might straddle. Preferably, at least four apertures 45 or 47 extend through the base 40, preferably in each of its corners. As shown, two overlapped transverse rectangular apertures 45 and 47 are provided in each corner. However, the apertures 45 and 47 need not necessarily overlap and may simply be arranged with the apertures 45 in parallel pairs on two opposite sides of the base 40 and the apertures 47 in parallel pairs on the other two opposite sides of the base 40. In such an arrangement, one set of parallel pairs 45 is spaced to facilitate use of the cap 40 with its smaller sized valve 10 and the other set of parallel pairs 47 is spaced more widely than the first to facilitate use of the cap 40 with its larger sized valve 10. However, the apertures 45 and 47 may be spaced apart and extended through the base 40 at any locations proximate a perimeter of the base 40. The corners of the base 40 are rounded. The base 40 is made of material which will be permanently altered by the application of force to the base 40 sufficient to disorient, distort, damage the mounted cap 30 to the extent necessary to permit operation of the valve cock 21 or 23. Preferably, this material is non-metallic and, most preferably, it is nylon or poly-carbonate.

The dome 50 preferably integrally extends upwardly from the base 40. It is preferably circular and of diameter 51 sufficient to cover the slots 41 and 43. The height 53 of the dome 50 is sufficient to contain the largest valve cock 23 for which the cap 30 is sized. As shown, the dome 50 has side walls 55 which are arcuate in vertical diametric planes through the dome 50 so as to make gripping the dome 50 with a tool such as a wrench or pliers (not shown) more difficult. However, the dome 50 need not be round and the side walls 55 need not be arcuate. Indicia 57 and 59 may be visible on the top face of the dome 50 to indicate the orientation of the valve cock 21 or 23 in the dome 50 at the time the cap 30 is installed. As shown, the indicia 57 and 59 designate the "closed" orientations for each of the two valve sizes, in the illustration for 1" and 1¼" valves, respectively. Indicia 58, such as a "tampering subject to prosecution" warning, may also be provided to dissuade or put on notice any would-be tamperers. The dome 50 may also be transparent so that the current orientation of the valve cock 21 or 23 can be observed without removing the cap 30 from the valve 10. The dome 50 is made of material which will be permanently altered by the application of force to the dome 50 sufficient to disorient the mounted cap 30 to the extent necessary to permit operation of the valve cock 21 or 23. Preferably, this material is non-metallic and, most preferably, it is nylon or poly-carbonate.

Figure 7:
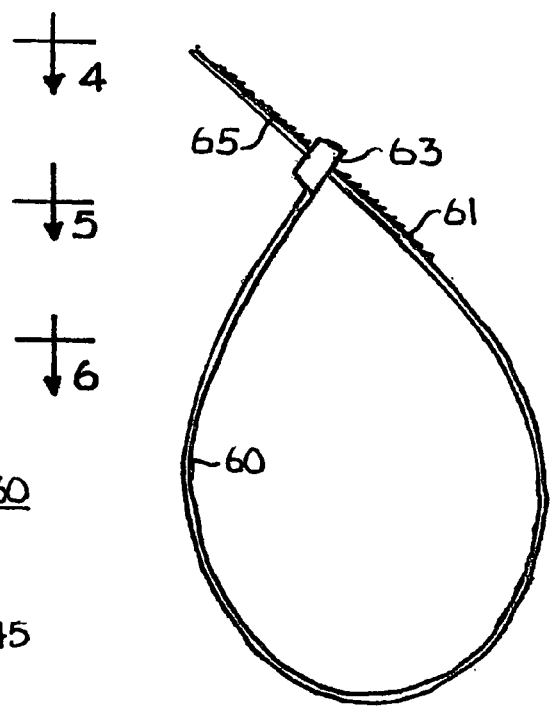
FIG. 7 is an elevation view of a wire tie for use in securing the cap of FIG. 2 to the valve of FIG. 1.
Figure 4:
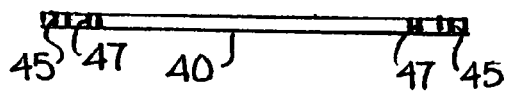
FIG. 4 is a cross-sectional view taken along the line 4-4 of FIG. 2.
Figure 5:
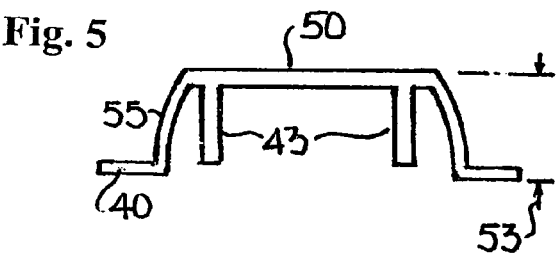
FIG. 5 is a cross-sectional view taken along the line 5-5 of FIG. 2.
Figure 3:
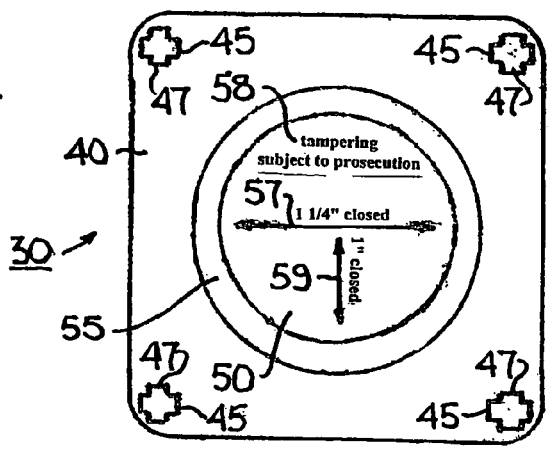
FIG. 3 is top plan view of the security cap of FIG. 2.
Figure 6:
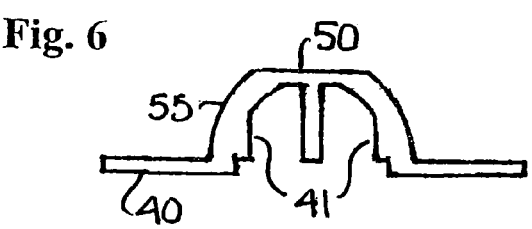
FIG. 6 is a cross-sectional view taken along the line 6-6 of FIG. 2.

Ties 60, best seen in FIG. 7, are used to mount the cap 30 on the valve 10. The ties 60 are preferably of the pull-to-tighten type in which a corrugated end 61 of the tie 60 loops through a ratchet type opening 63 in the other end of the tie 60. One tie 60a extends around the inlet pipe 15 and through a first pair of the apertures 45 or 47 in the base 40 to secure one side of the base 40 against the valve body 11. The other tie 60b extends around the outlet pipe 17 and through a second pair of the apertures 45 or 47 in the base 40 to secure the opposite side of the base 40 against the valve body 11. The corrugated or free ends 61 of the ties 60 are pulled, perhaps by use of pliers (not shown), through the ratchet openings 63 in their other ends until the ties 60 tautly secure the base 40 to the valve body 11. The thin rectangular cross-sections of the ties 60 are oriented by the rectangular apertures 45 or 47 so that the ties 60 are smoothly and tautly held against the pipes 15 and 17 and the base 40. The ties 60 can be inserted through the apertures 45 or 47 in either direction and can be fastened with their ratchet end 63 at any point on the tautened tie 60. Once securely fastened, the excess 65 of the free ends 61 of the ties 60 may be snipped or trimmed off so that reuse of the ties 60 with the same size pipes 15 and 17 is difficult, if not impossible. The ties 60 may be specially color coded or may contain a special component of composition which renders them uniquely identifiable from ties commonly available to the public. Preferably, the ties 60 are made of material which will be permanently altered by application of force to the ties 60 to sufficient to disorient the mounted cap 30 to the extent necessary to permit operation of the valve cock 21 or 23. Preferably, this material is non-metallic and, most preferably, it is nylon. A common size for the untrimmed ties 60 would, as an example, be in the order of 3/16" wide×1/16" thick×14" long.

It is presently intended that the entire cap 30, including the base 40, dome 50 and ties 60, will be optionally available in opaque yellow nylon and transparent or clear acrylic or poly-carbonate. It is also anticipated that the caps 30 will be made in two models, one sized to accommodate 1" and 1¼" valves and the other to accommodate 1½" and 2" valves. The following slot dimensions and dome heights are given as approximate examples of cap configurations. For typical 1" valves, the slots are 1.07" long by 0.475" wide with domes 0.55" high. For typical 1¼" valves, the slots are 1.45" long by 0.725" wide with domes 0.55" high. For typical 1½" valves, the slots are 1.229" long by 0.55" wide with domes 0.75" high. For typical 2" valves, the slots are 2.01" long by 0.68" wide with domes 0.75" high. The caps 30 can, of course, be configured to accommodate one or two valves 10 of any size.

Figure 8:
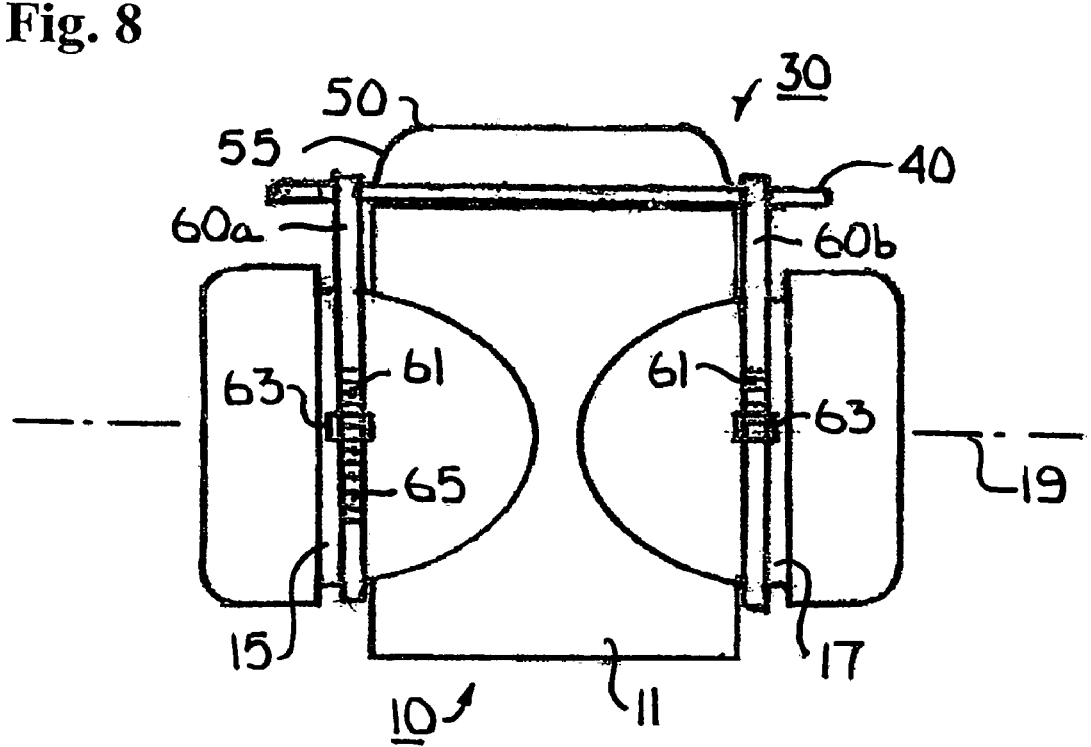
FIG. 8 is a side elevation view of the security cap of FIG. 2 mounted on the gas service valve of FIG. 1 using the wire ties of FIG. 7.
Figure 2:
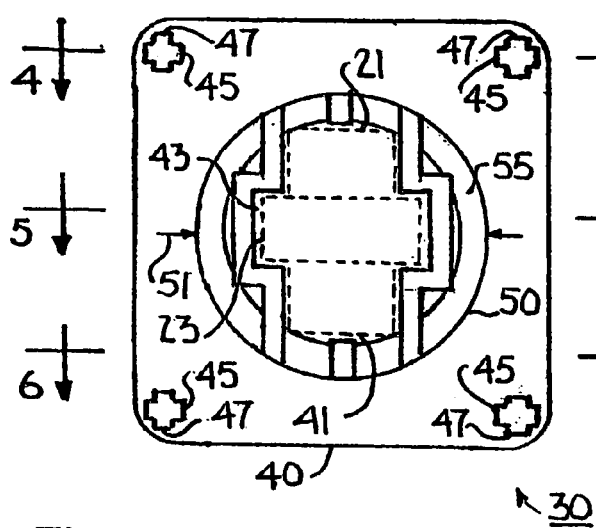
FIG. 2 is bottom plan view of a preferred embodiment of a security cap for use with the valve of FIG. 1.

Looking at FIG. 8, a cap 30 is mounted on a 1" valve 10 with its valve cock 13 in a "closed" position. The cap 30 is seated on the valve body 11 with the 1" valve slot 41, and therefore also the 1" closed indicia 57, parallel to the pipe axis 19. The ties 60 are extended through corresponding rectangular apertures 45 which are lengthwise oriented with respect to the pipe axis 19 so that the ties 60*a* and 60*b* can be smoothly tautened against the inlet and outlet pipes 15 and 17, respectively, of the valve 10 and against the base 40. The free end 61 of one of the tautened ties 60*a* has been trimmed so that, if broken, it is difficult, if not impossible, to reconnect the cap 30 using the same tie 60*a*. Any attempt to disorient the cap 30 from its mounted condition sufficiently to access and operate the valve cock 13 will permanently deform, distort, damage or break a cap component 40, 50 and/or 60 so as to indicate the occurrence of tampering. Of course, if the cap 30 is completely removed, further evidence of tampering is unnecessary.

Thus, it is apparent that there has been provided, in accordance with the invention, a security cap for a gas distribution valve that fully satisfies the objects aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For permanently indicating an occurrence of tampering with a gas service valve having a body with an "open-closed" valve cock, a cap comprising:
    a base defining a slot sized to confine a valve cock extending therein against rotational motion, said base having apertures spaced apart and extending therethrough proximate a perimeter thereof;
    a dome extending upwardly from said base, covering said slot and having a height sufficient to contain a valve cock received therein;
    two ties of adjustable length, one of said ties for taut extension around an inlet pipe of the valve and through a pair of said apertures to secure one side of said base against the valve body and another of said ties for taut extension around an outlet pipe of the valve and through a pair of said apertures to secure an opposite side of said base against the valve body.

2. A cap according to claim 1, said base, said dome and said ties being made of material which is permanently altered by application of force to disorient a mounted cap sufficiently to permit operation of the valve cock.

3. A cap according to claim 2, said material being non-metallic.

4. A cap according to claim 3, said material being nylon.

5. A cap according to claim 3, said material being polycarbonate.

6. A cap according to claim 1, excess portions of said ties being removed therefrom after end-to-end taut connection thereof.

7. A cap according to claim 1, said ties being made of a color suitable to distinguish said ties from ties generally available to the public.

8. A cap according to claim 1, said ties being made of material having a component suitable to distinguish said ties from ties generally available to the public.

9. A cap according to claim 1, said dome being transparent.

10. A cap according to claim 1 further comprising indicia on said dome indicating an orientation of the valve cock.

11. A cap according to claim 1, said dome having arcuate side walls.

12. For permanently indicating an occurrence of tampering with a gas service valve having a body with an "open-closed" valve cock, a cap comprising:
    a substantially square base having intersecting slots therein defining a cross-shaped opening centered on said base, each said slot sized to confine a different sized valve cock extending therein against rotational motion, said base having an aperture through each corner thereof;
    a dome centered on and integrally extending upwardly from said base, covering said intersecting slots and having a height sufficient to contain a valve cock received into one of said slots;
    two ties of adjustable length, one of said ties for taut extension around an inlet pipe of the valve and through a first neighboring pair of said apertures to secure one side of said base against the valve body and another of said ties for taut extension around an outlet pipe of the valve and through a second neighboring pair of said apertures to secure an opposite side of said base against the valve body.

13. A cap according to claim 12, said base, said dome and said ties being made of material which is permanently altered by application of force to disorient a mounted cap sufficiently to permit operation of the valve cock.

14. A cap according to claim 12, said material being non-metallic.

15. A cap according to claim 14, said material being nylon.

16. A cap according to claim 14, said material being polycarbonate.

17. A cap according to claim 12, excess portions of said ties being removed therefrom after end-to-end taut connection thereof.

18. A cap according to claim 12, said ties being made of a color suitable to distinguish said ties from ties generally available to the public.

19. A cap according to claim 12, said ties being made of material having a component suitable to distinguish said ties from ties generally available to the public.

20. A cap according to claim 12, said dome being transparent.

21. A cap according to claim 12 further comprising indicia on said dome indicating an orientation of the valve cock.

22. A cap according to claim 12, said dome having arcuate side walls.

* * * * *